(12) United States Patent
Wang

(10) Patent No.: US 9,015,458 B2
(45) Date of Patent: Apr. 21, 2015

(54) COMPUTER SYSTEM AND METHOD FOR UPDATING BASIC INPUT/OUTPUT SYSTEM BY SWITCHING BETWEEN LOCAL MODE AND BYPASS MODE THROUGH BASEBOARD MANAGEMENT CONTROLLER

(75) Inventor: Hao-Hao Wang, Shanghai (CN)

(73) Assignee: Inventec Corporation, Taipei (TW)

( * ) Notice: Subject to any disclaimer, the term of this patent is extended or adjusted under 35 U.S.C. 154(b) by 579 days.

(21) Appl. No.: 13/397,090

(22) Filed: Feb. 15, 2012

(65) Prior Publication Data

US 2013/0138940 A1 May 30, 2013

(30) Foreign Application Priority Data

Nov. 30, 2011 (CN) .......................... 2011 1 0391218

(51) Int. Cl.
| | | |
|---|---|---|
| G06F 9/00 | (2006.01) | |
| G06F 9/24 | (2006.01) | |
| G06F 15/177 | (2006.01) | |
| G06F 9/445 | (2006.01) | |
| G06F 11/14 | (2006.01) | |
| G06F 11/07 | (2006.01) | |

(52) U.S. Cl.
CPC ............ *G06F 8/665* (2013.01); *G06F 11/1417* (2013.01); *G06F 11/0793* (2013.01)

(58) Field of Classification Search
CPC .... G06F 8/65; G06F 11/1417; G06F 11/0793
See application file for complete search history.

(56) References Cited

U.S. PATENT DOCUMENTS

| | | | |
|---|---|---|---|
| 7,631,174 B2* | 12/2009 | Koizumi | 713/1 |
| 2005/0229173 A1* | 10/2005 | Mihm et al. | 717/171 |
| 2009/0132799 A1* | 5/2009 | Brumley et al. | 713/100 |
| 2012/0023320 A1* | 1/2012 | Chen et al. | 713/2 |

FOREIGN PATENT DOCUMENTS

| | | |
|---|---|---|
| CN | 101364193 A | 2/2009 |
| CN | 101373433 A | 2/2009 |
| CN | 101751265 A | 6/2010 |
| TW | 201007469 A | 2/2010 |

* cited by examiner

*Primary Examiner* — Thomas Lee
*Assistant Examiner* — Zhipeng Wang
(74) *Attorney, Agent, or Firm* — CKC & Partners Co., Ltd.

(57) ABSTRACT

A computer system including a central processing unit (CPU), a chipset connected to the CPU, a baseboard management controller (BMC) connected to the chipset, and a basic input/output system (BIOS) unit connected to the BMC is provided. The BMC switches a connection mode which the BMC connecting to the BIOS unit between a local mode and a bypass mode. The BIOS unit communicates with the chipset directly, when the connection mode is switched to the bypass mode. The BMC switches the connection mode from the bypass mode to the local mode, when the BIOS unit should be updated. Then, the BMC communicates with the BIOS unit directly, and the BIOS updating file is written into the BIOS unit.

32 Claims, 6 Drawing Sheets

COMPUTER SYSTEM AND METHOD FOR UPDATING BASIC INPUT/OUTPUT SYSTEM BY SWITCHING BETWEEN LOCAL MODE AND BYPASS MODE THROUGH BASEBOARD MANAGEMENT CONTROLLER

CROSS-REFERENCE TO RELATED APPLICATION

This application claims the priority benefit of China application serial no. 201110391218.0, filed on Nov. 30, 2011. The entirety of the above-mentioned patent application is hereby incorporated by reference herein and made a part of this specification.

BACKGROUND OF THE INVENTION

1. Field of the Invention

The present invention relates to a computer system. Specifically, the present invention relates to a method for updating the basic input/output system (hereinafter "BIOS") and a computer system using the same.

2. Description of Related Art

Due to the rapid development of personal computers, new peripheral equipments are introduced to the market rapidly. BIOS needs to be updated frequently to enhance the computing speed and function of computer systems, to solve the deficiencies or error of hardware design, or to recover the damage of the BIOS content caused by computer viruses. During the process of updating the BIOS, if a sudden power failure arises, the entire content of the BIOS will be damaged, resulting in failure boot of the computer system. The computer system needs to be sent back to the manufacturer to restore the BIOS.

There are lots of techniques for protecting the BIOS. For example, in a single-BIOS system, a hardware mechanism is deployed to protect the boot block in the BIOS to prevent the aforementioned situation from happening and damage the boot lock. However, the flaw of the method is that the boot block in the BIOS cannot be updated.

Take dual-BIOS as another example. When one of the BIOS is damaged, the computer system may use the other BIOS to boot the system. Because the computer system already has two BIOS, no hardware protection for the boot block of the BIOS is needed. Therefore, even if the boot block of one BIOS is damaged, the computer system can still be booted by the other BIOS, and recover the damaged BIOS. While such method may have resolved the flaw of the aforementioned method, dual-BIOS is needed to implement such conventional technique. Thus, the required cost of the hardware of the computer system is higher.

Therefore, in order to prevent a dramatic increase in the cost and the time for entirely recycling the hardware system for replacement or update, the industry needs to provide faster and more instant methods to update the BIOS in personal computer systems. In other words, a technique to automatically recover the BIOS content when the original BIOS content is entirely damaged, is needed.

SUMMARY OF THE INVENTION

Accordingly, the present invention is directed to a computer system and a method for updating the BIOS thereof. By automatically switching between the local mode and the bypass mode through the baseboard management controller (BMC), even if the original BIOS content is entirely damaged, the BIOS content can be automatically updated and recovered.

The present invention provides a computer system, which includes a central processing unit, a chipset connected to the central processing unit, a baseboard management controller connected to the chipset and a BIOS unit connected to the baseboard management controller. The baseboard management controller switches the connection mode of the baseboard management controller with the BIOS unit between the local mode and the bypass mode. In the bypass mode, the BIOS unit communicates with the chipset directly. the BIOS unit is needed to be updated, the baseboard management controller switches the connection mode from the bypass mode to the local mode. Thus, the baseboard management controller communicates with the BIOS unit directly and directly writes the BIOS updating file into the BIOS unit.

In an embodiment of the present invention, when the BIOS updating file is written completely, the baseboard management controller switches the connection mode to the bypass mode before the central processing unit is powered on next time. In addition, when the central processing unit is powered on next time, the central processing unit reads the updated BIOS message through the chipset.

In an embodiment of the present invention, the BIOS unit is a flash memory.

In an embodiment of the present invention, the processes of the baseboard management controller switching between the local mode and the bypass mode and communicating with the BIOS unit are independent from the working state of the central processing unit.

In an embodiment of the present invention, when the central processing unit is in the working state or in the power-off state, the baseboard management controller is always in the working state. When the BIOS unit is needed to be updated, the baseboard management controller switches the connection mode to the local mode and writes the BIOS updating file into the BIOS unit.

In an embodiment of the present invention, the baseboard management controller is connected to a network interface. A remote control unit is coupled to the network interface. The baseboard management controller communicates with the remote control unit via the network interface. When the BIOS unit is needed to be updated, the baseboard management controller receives a BIOS updating command from the remote control unit and switches the connection mode to the local mode according to the BIOS updating command.

In an embodiment of the present invention, the baseboard management controller further receives a BIOS updating file corresponding to the BIOS updating command from the remote control unit and writes the BIOS updating file into the BIOS unit.

In an embodiment of the present invention, the baseboard management controller further receives the BIOS updating file corresponding to the BIOS updating command from the remote storage unit and writes the BIOS updating file into the BIOS unit.

In an embodiment of the present invention, the remote control unit and the remote storage unit are located in a same electronic device.

In an embodiment of the present invention, the BIOS updating command and the BIOS updating file are stored in the baseboard management controller, and the baseboard management controller further writes the BIOS updating file into the BIOS unit.

In an embodiment of the present invention, the network interface is an outband network interface, which is directly connected to the baseboard management controller.

In an embodiment of the present invention, the network interface is an inband network interface, which is connected to the chipset. The baseboard management controller communicates with the remote control unit by a sideband way.

In an embodiment of the present invention, the baseboard management controller detects a current version message of the BIOS file in the BIOS unit and compares the current version message with a standard version message. If the current version message is inconsistent with the standard version message, the baseboard management controller switches the connection mode to the local mode.

In an embodiment of the present invention, the baseboard management controller is connected to a network interface, a remote storage unit is coupled to the network interface. If the current version message of the BIOS file in the BIOS unit is inconsistent with the standard version message, the baseboard management controller requests the BIOS updating file corresponding to the standard version message from the remote storage unit and writes the BIOS updating file into the BIOS unit.

In an embodiment of the present invention, the standard version message is within the remote storage unit. The baseboard management controller periodically obtains the standard version message from the remote storage unit and compares standard version message with the current version message of the BIOS file in the BIOS unit.

In an embodiment of the present invention, the network interface is an outband network interface, which is directly connected to the baseboard management controller.

In an embodiment of the present invention, the network interface is an inband network interface, which is connected to the chipset. The baseboard management controller communicates with the remote storage unit by a sideband way.

In an embodiment of the present invention, the baseboard management controller stores the BIOS updating file corresponding to the standard version message, and the baseboard management controller further writes the BIOS updating file into the BIOS unit.

In an embodiment of the present invention, when in the bypass mode, the baseboard management controller communicates with the BIOS unit by the chipset and detects the current version message of the BIOS file in the BIOS unit.

In an embodiment of the present invention, when in the local mode, the baseboard management controller directly obtains the current version message of the BIOS file in the BIOS unit.

In an embodiment of the present invention, the computer system further includes a keyboard controller style (KCS) interface. A keyboard controller style unit is coupled to the keyboard controller style interface. The baseboard management controller communicates with the keyboard controller style unit by the keyboard controller style interface. The baseboard management controller receives a BIOS updating command from the keyboard controller style unit, and switches the connection mode to the local mode according to the BIOS updating command to update.

In an embodiment of the present invention, the baseboard management controller is connected to a intelligent platform management bus (IPMB) interface. A control unit is coupled to the intelligent platform management bus interface. The baseboard management controller communicates with the control unit via the intelligent platform management bus interface.

In an embodiment of the present invention, the baseboard management controller includes an interface unit. The baseboard management controller switches the interface unit between the local mode and the bypass mode to change the connection mode of the baseboard management controller with the BIOS unit.

In an embodiment of the present invention, the chipset is a platform controller hub (PCH) unit. The interface of the baseboard management controller is a serial peripheral interface (SPI) unit. The BIOS unit and the platform controller hub unit connect to the interface unit by a serial peripheral interface line respectively. When the interface is in the bypass mode, the BIOS unit communicates with the platform controller hub unit directly.

In an embodiment of the present invention, when the connection mode between the baseboard management controller and the BIOS unit is in the bypass mode, the baseboard management controller communicates with the BIOS unit by the chipset.

In addition, the present invention provides a method for updating BIOS of computer systems. The method includes the following steps. First, a computer system is provided, which includes a central processing unit, a chipset connected to the central processing unit, a baseboard management controller connected to the chipset and a BIOS unit connected to the baseboard management controller. The baseboard management controller switches the connection mode with the BIOS unit to the local mode. In addition, the BIOS updating file is written directly into the BIOS unit by the baseboard management controller. The baseboard management controller communicates with the BIOS unit directly. Before the central processing unit is powered on next time, switch the connection mode with the BIOS unit to the bypass mode by the baseboard management controller. The BIOS unit communicates with the chipset directly. When the central processing unit is powered on, read the updated BIOS message by the chipset, to complete the update of the BIOS unit.

According to the above, the computer system and the method for updating the BIOS thereof provided in the present invention automatically switches between the local mode and the bypass mode by the baseboard management controller. In the local mode, the baseboard management controller may access the BIOS unit directly. In addition, in the bypass mode, the central processing unit may directly read the updated BIOS message in the BIOS unit to automatically update and recover the BIOS content.

In order to make the aforementioned and other features and advantages of the invention more comprehensible, several embodiments accompanied with figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DETAILED DESCRIPTION OF DISCLOSED EMBODIMENTS

Figure 1A:
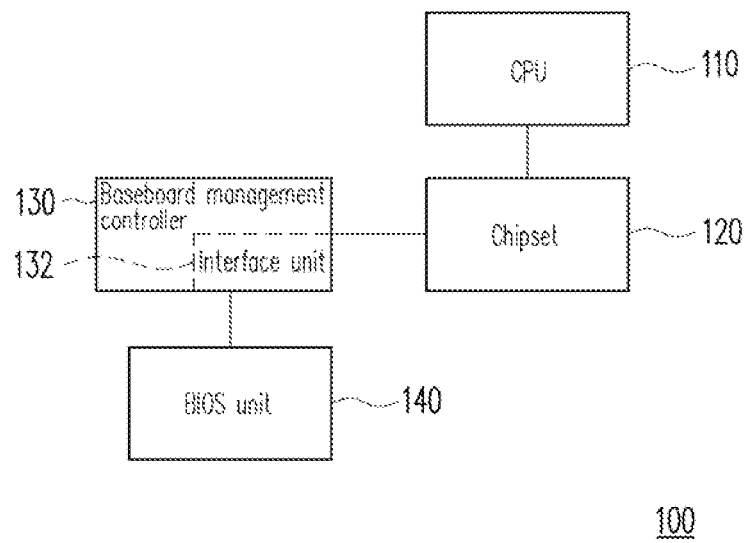
FIG. 1A is a block diagram of a computer system according to an embodiment of the present invention.

FIG. 1A is a block diagram of a computer system according to an embodiment of the present invention. Referring to FIG. 1A, the computer system 100 includes a central processing unit 110 (CPU), chipset 120, a baseboard management controller 130 and a BIOS unit 140. The chipset 120 is connected to the central processing unit 110 and the baseboard management controller 130, respectively. The BIOS unit 140 is connected to the baseboard management controller 130. The BIOS unit may be stored in, for example, a non-volatile memory. In the present computer system, the non-volatile memory is, for example, a flash memory.

Specifically, the baseboard management controller 130 may include an interface unit 132. The connection mode between the baseboard management controller 130 and the BIOS unit 140 may be a local mode or a bypass mode. The baseboard management controller 130 switches between the local mode and the bypass mode by switching the interface unit 132. The difference between the local mode and the bypass mode will be explained in the following.

Figure 1B:
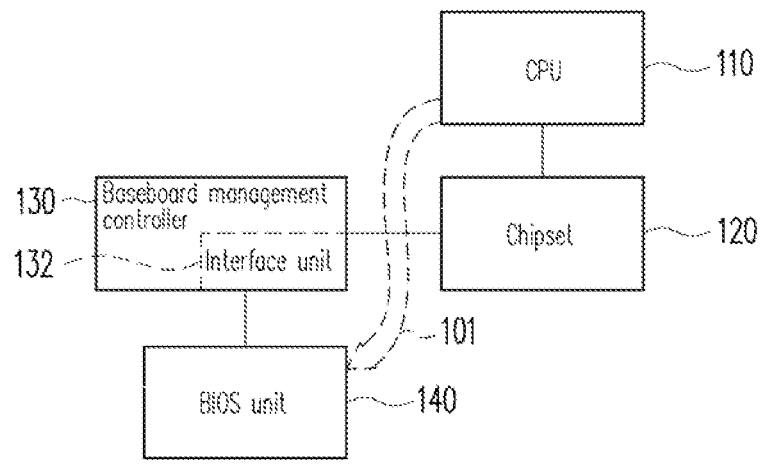
FIG. 1B is a schematic diagram illustrating the data flow of the central processing unit in the local mode according to an embodiment of the present invention.

When the interface unit 132 is in the bypass mode, the BIOS unit 140 may communicate with the chipset 120 directly. For example, the chipset 120 may be a platform controller hub (PCH) unit, and the interface unit 132 of the baseboard management controller 130 may be a serial peripheral interface (SPI) unit. The BIOS unit 140 and the PCH unit connect to the interface unit 132 via a SPI line, respectively. In other words, when the interface unit 132 is in the bypass mode, the BIOS unit 140 communicates with the PCH unit directly. That is, when the computer system 100 is powered on, the central processing unit 110 directly reads the content of the BIOS unit 140 by the SPI unit of the PCH unit to enter a boot state (as shown by data flow 101 in FIG. 1B). The content of the BIOS unit 140 may be, for example, the BIOS firmware program code.

When the BIOS unit 140 is needed to be updated, the baseboard management controller 130 switches the interface unit 132 to switch the connection mode from the bypass mode to the local mode. At this time, the baseboard management controller 130 communicates with the BIOS unit 140 directly and writes the BIOS updating file into the BIOS unit 140 according to the specified format. The BIOS updating file may be, for example, the BIOS image file. It is to be noted that in the bypass mode, if the baseboard management controller 130 still wants to communicate with the BIOS unit 140, the baseboard management controller 130 may access the BIOS unit 140 by using the chipset as a bridge. The connection mode does not need to be switched back to the local mode.

Figure 2:
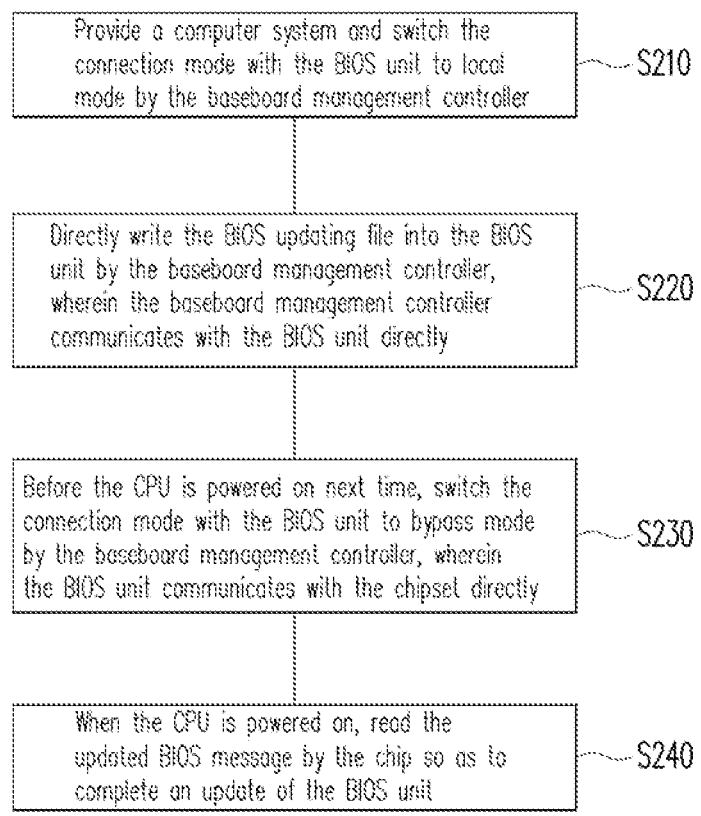
FIG. 2 is a flowchart illustrating a method for updating the BIOS of the computer system according to an embodiment of the present invention.

After understanding the difference between the local mode and the bypass mode, FIG. 2 is a flowchart illustrating the method for updating the BIOS of the computer system according to an embodiment of the present invention. The method in this embodiment is adapted for the computer system 100 in FIG. 1A. FIG. 1A will be used to explain the method in this embodiment.

As shown in step S210, a computer system is provided. The computer system in this embodiment is the computer system 100 as shown in FIG. 1A, and therefore is not further explained. The baseboard management controller 130 of the computer system 100 switches the connection mode with the BIOS unit 140 to the local mode.

In step S220, the BIOS updating file is written directly into the BIOS unit 140 via the baseboard management controller 130. The baseboard management controller 130 in the local mode communicates with the BIOS unit 140 directly. It should be noted that the processes of the baseboard management controller 130 switching the interface unit 132 between the local mode and the bypass mode and communicating with the BIOS unit 140 are independent from the working state of the central processing unit 110. That is, no matter the central processing unit 100 is in the working state or in the power-off state, the baseboard management controller is always in the working state. When the BIOS unit 140 is needed to be updated, the baseboard management controller 130 writes the BIOS updating file into the BIOS unit 140.

In step S230, before the central processing unit is powered on next time, switch the connection mode with the BIOS unit to the bypass mode by the baseboard management controller 130. At this time, the BIOS unit 140 communicates with the chipset 120 directly. That is, the switching point of the bypass mode and the local mode in the present invention may depend on the user's choice according to the actual situation, as long as after the BIOS updating file is written into the BIOS unit 140 and before the central processing unit 110 is powered on and rebooted next time, the connection mode is switched to the bypass mode.

Then, as shown by step S240, when the central processing unit 110 is powered on, read the updated BIOS message by the chipset 120 to complete the update of the BIOS unit 140.

In brief, the aforementioned computer system and the method for updating the BIOS thereof provide automatically switching between the local mode and the bypass mode by the baseboard management controller. In the local mode, the baseboard management controller may access the BIOS unit directly. In addition, in the bypass mode, the central processing unit may directly read the updated BIOS message in the BIOS unit to automatically update and recover the BIOS content.

The following embodiment further explains how the computer system determines that a BIOS update is needed and how to receive the BIOS updating file.

Figure 3:
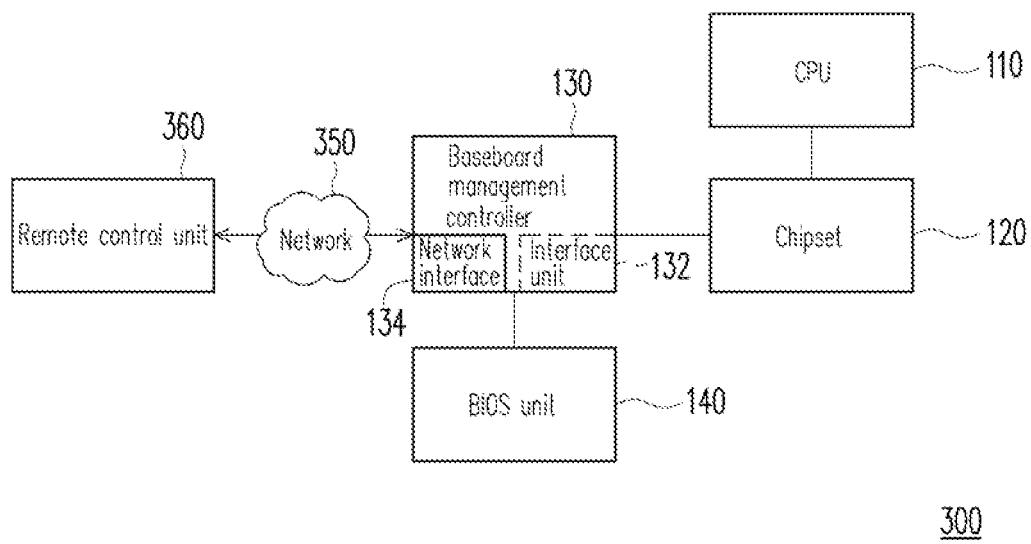
FIG. 3 is a block diagram of a computer system according to another embodiment of the present invention.
Figure 4:
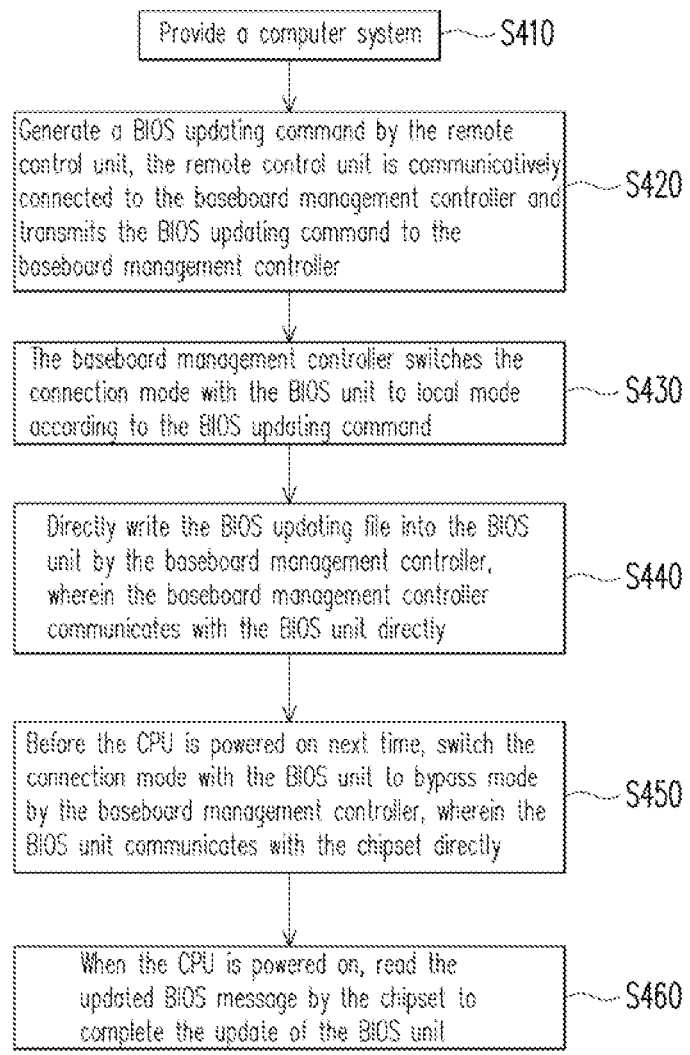
FIG. 4 is a flowchart illustrating a method for updating the BIOS of the computer system according to another embodiment of the present invention.

FIG. 3 is a block diagram of a computer system according to another embodiment of the present invention. Referring to FIG. 3, the difference between the computer system 300 in this embodiment and the computer system 100 in FIG. 1A is: the baseboard management controller 130 further includes a network interface 134. A network 350 can be connected via the network interface 134. A remote control unit 360 can be connected via the network 350. The network interface 134 can be an outband network interface or an inband network interface. If the network interface 134 is an outband network interface, the network interface 134 directly connects to the baseboard management controller 130. If the network interface 134 is an inband interface, the network interface 134 connects to the chipset 120, and the baseboard management controller 130 communicates with the remote control unit 360 by a sideband way. FIG. 4 is a flowchart illustrating a method for updating the BIOS of the computer system according to another embodiment of the present invention. Please refer to FIGS. 3 and 4 for the following explanation.

First, a computer system is provided, the computer system is, for example, the computer system 300 in FIG. 3 (Step S410). Then, a BIOS updating command is generated by the remote control unit 360. The remote control unit 360 is communicatively connected to the baseboard management controller 130 and transmits the BIOS updating command to the baseboard management controller 130 (Step S420). For example, when a user determines that the BIOS of the computer system 300 needs to be updated, the user may control the remote control unit 360 to transmit a BIOS updating command to the baseboard management controller 130. After the baseboard management controller 130 receives the BIOS updating command via the network 350 and the network interface 134, the connection mode can be switched to the local mode according to the BIOS updating command (Step S430). The network 350 may be a network of any type, for example, the Web, the file transfer protocol (FTP) network, the trivial file transfer protocol (TFTP) network or secure shell (SSH) network, etc.

Then, the baseboard management controller 130 switched to the local mode can directly communicate with the BIOS unit 140. At this time, the BIOS updating file is directly written into the BIOS unit 140 by the baseboard management controller 130 (Step S440). In an embodiment of the present invention, the baseboard management controller may further receive the BIOS updating file corresponding to the BIOS updating command from the remote control unit 360. In another embodiment, the BIOS updating file corresponding to the BIOS updating command is stored in the baseboard management controller 130. That is, the BIOS updating command and the BIOS updating file may be stored in the baseboard management controller 130 after simultaneously received. Alternately, the BIOS updating command and the BIOS updating file may be received at different times.

After updating the BIOS unit 140 and before the central processing unit 110 is powered on next time, the baseboard management controller 130 switches the connection mode with the BIOS unit 140 back to the bypass mode. The BIOS unit 140 switched back to the bypass mode may communicate with the chipset 120 directly (Step S450). Then, when the central processing unit 110 is powered on, the updated BIOS message is read by the chipset 120 to complete the update of the BIOS unit 140 (Step S460).

The embodiments in FIGS. 3 and 4 explain that the computer system 300 may determine when to update the BIOS unit 140 according to the BIOS updating file transmitted by the remote control unit 360. In addition, the computer system 300 may receive the BIOS updating file via the remote control unit 360. The way of controlling the update of the BIOS by the remote control unit 360 in the present invention can be referred as the push update model.

Figure 5:
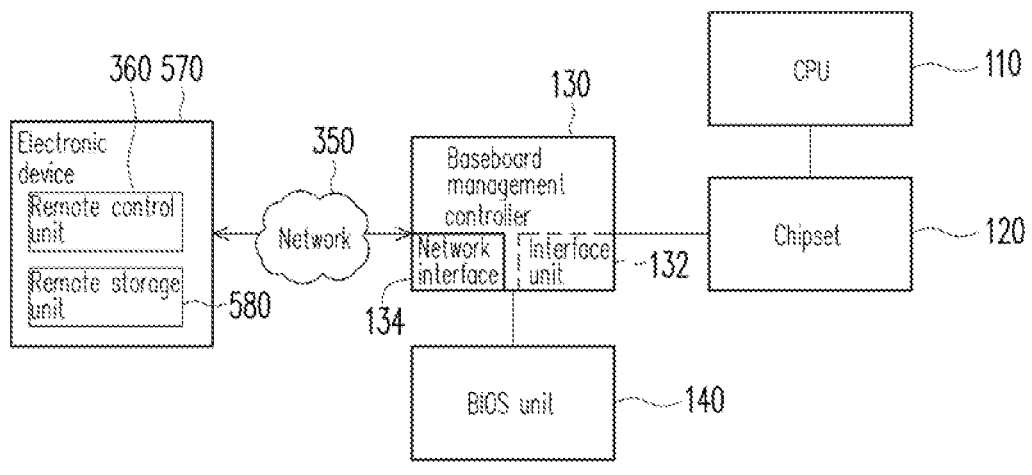
FIG. 5 is a block diagram of a computer system according to yet another embodiment of the present invention.
Figure 6:
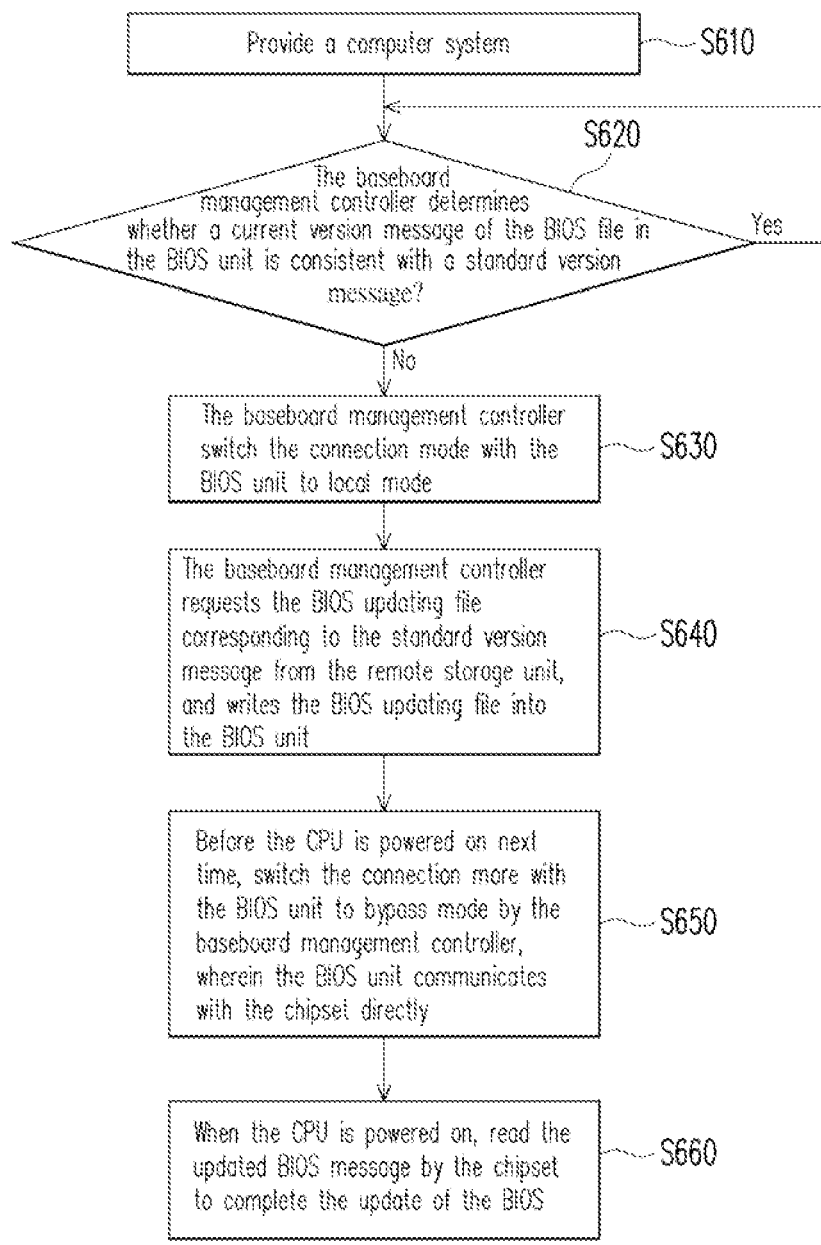
FIG. 6 is a flowchart illustrating a method for updating the BIOS of the computer system according to yet another embodiment of the present invention.

Take another embodiment as an example, FIG. 5 is a block diagram of a computer system according to yet another embodiment of the present invention. Referring to FIG. 5, the difference between the computer system 500 in this embodiment and the computer system 300 in FIG. 3 is: the remote control unit 360 is located in an electronic device 570, and the electronic device 570 includes a remote storage unit 580. The remote storage unit 580 may be, for example, any type of fixed or portable random access memory (RAM), read-only memory (ROM), flash memory, hard disk . . . etc. FIG. 6 is a flowchart illustrating a method for updating the BIOS of the computer system according to yet another embodiment of the present invention. Refer to FIGS. 5 and 6 in the following sections.

First, a computer system is provided. The computer system is, for example, the computer system 500 in FIG. 5. (Step S610). Then, the baseboard management controller 130 determines whether a current version message of the BIOS file in the BIOS unit 140 is consistent with a standard version message (Step S620). The standard version message is within the remote storage unit 580. The baseboard management controller 130 periodically obtains the standard version message from the remote storage unit 580 via the network 350, and compares the standard version message with the current version message of the BIOS file in the BIOS unit.

If the current version message is inconsistent with the standard version message, the baseboard management controller 130 switches the connection mode to the local mode (Step S630). Because the standard version message is updated periodically, standard version message stores the latest version message of the BIOS file. Therefore, when the current version message is inconsistent with the standard version message, the BIOS unit 140 in the local computer system 500 needs to by updated. As a result, the baseboard management controller 130 requests the BIOS updating file corresponding to the standard version message from the remote storage unit 580, and writes the BIOS updating file into the BIOS unit 140 (Step S640). In another embodiment, the BIOS updating file corresponding to the standard version message can be simultaneously received with the standard version message and stored in the baseboard management controller 130.

After the BIOS unit 140 is updated and before the central processing unit 110 is powered on next time, the baseboard management controller 130 switches the connection mode with the BIOS unit 140 from the local mode back to the bypass mode (Step S650). Then, when the central processing unit 110 is powered on, read the updated BIOS message by the chipset 120 to complete the update of the BIOS unit 140. (Step S660).

The embodiments in FIGS. 5 and 6 explain that the computer system 500, by the baseboard management controller 130, may actively and periodically determine whether the current version message in the BIOS unit 140 is consistent with the standard version message. If the current version message is inconsistent with the standard version message, the BIOS updating file corresponding to the standard version message is further used to update. The way of actively determining whether the BIOS needs to be updated, by the baseboard management controller 130, in the present invention can be referred as the drag update model.

The present invention further provides two different remote connection methods. In one embodiment, the computer system further includes a keyboard controller style (KCS) interface. A keyboard controller style unit is coupled to the keyboard controller style interface. The baseboard management controller communicates with the keyboard controller style unit by the keyboard controller style interface. The baseboard management controller receives a BIOS updating command from the keyboard controller style unit, and switches the connection mode to the local mode according to the BIOS updating command to update. In another embodiment, the baseboard management controller is connected to an intelligent platform management bus (IPMB) interface. A control unit is coupled to the intelligent platform management bus interface. The baseboard management controller communicates with the control unit via the intelligent platform management bus interface.

In summary, the present invention automatically switches between the local mode and the bypass mode by the baseboard management controller. The baseboard management controller may access the BIOS unit and write the BIOS updating file. Even if the BIOS unit is damaged, new BIOS content can be written. In addition, in the bypass mode, the central processing unit may directly read the updated BIOS content in the BIOS unit to implement automatic update and BIOS content recovery. As a result, the hardware of the BIOS unit does not need to be replaced or updated. The baseboard management controller will complete the BIOS update procedure. Furthermore, in the present invention, the process of switching between the local mode and the bypass mode is independent from the working state of the central processing unit. As long as the computer system is restarted to effectuate the updated BIOS content after the update of the BIOS unit is completed, the effect on processing time of the computer system will be lessened.

Although the present invention has been described with reference to the above embodiments, it will be apparent to one of the ordinary skill in the art that modifications to the described embodiment may be made without departing from the spirit of the present invention. Accordingly, the scope of the present invention will be defined by the attached claims not by the above detailed descriptions.

What is claimed is:

1. A computer system, comprising:
a central processing unit;
a chipset, connected to the central processing unit;
a baseboard management controller, connected to the chipset; and
a basic input/output system unit, connected to the baseboard management controller,
wherein the baseboard management controller comprises an interface unit, the baseboard management controller switches the interface unit between the local mode and the bypass mode, so as to change a connection mode of the baseboard management controller with the basic input/output system unit,
wherein the baseboard management controller switches the connection mode of the baseboard management controller with the basic input/output system unit between a local mode and a bypass mode, when in the bypass mode, the basic input/output system unit communicates with the chipset directly, and
when the basic input/output system unit is needed to be updated, the baseboard management controller switches the connection mode from the bypass mode to the local mode, the baseboard management controller communicates with the basic input/output system unit directly and directly writes a basic input/output system updating file into the basic input/output system unit.

2. The computer system according to claim 1, wherein after the basic input/output system updating file is written completely, the baseboard management controller switches the connection mode of the basic input/output system unit to the bypass mode before the central processing unit is powered on next time, and when the central processing unit is powered on next time, the central processing unit reads an updated basic input/output system message by the chipset.

3. The computer system according to claim 1, wherein the basic input/output system unit is a flash memory.

4. The computer system according to claim 1, wherein a process of the baseboard management controller switching between the local mode and the bypass mode and communicating with the basic input/output system unit is independent from a working state of the central processing unit.

5. The computer system according to claim 4, wherein when the central processing unit is in the working state or in a power-off state, the baseboard management controller is always in the working state, and
when the basic input/output system unit is needed to be updated, the baseboard management controller switches the connection mode to the local mode and writes the basic input/output system unit updating file into the basic input/output system unit.

6. The computer system according to claim 1, wherein the baseboard management controller is connected to a network interface, a remote control unit is coupled to the network interface, the baseboard management controller communicates with the remote control unit via the network interface, wherein when the basic input/output system unit is needed to be updated, the baseboard management controller receives a basic input/output system updating command from the remote control unit and switches the connection mode to the local mode according to the basic input/output system updating command.

7. The computer system according to claim 6, wherein the baseboard management controller further receives the basic input/output system updating file corresponding to the basic input/output system updating command from the remote control unit, and writes the basic input/output system updating file into the basic input/output system unit.

8. The computer system according to claim 6, wherein the baseboard management controller further receives the basic input/output system updating file corresponding to the basic input/output system updating command from a remote storage unit, and writes the basic input/output system updating file into the basic input/output system unit.

9. The computer system according to claim 8, wherein the remote control unit and the remote storage unit are located in a same electronic device.

10. The computer system according to claim 6, wherein the basic input/output system updating file corresponding to the basic input/output system updating command is stored in the baseboard management controller, and the baseboard management controller further writes the basic input/output system updating file into the basic input/output system unit.

11. The computer system according to claim 6, wherein the network interface is an outband network interface, the outband network interface directly connects to the baseboard management controller.

12. The computer system according to claim 6, wherein the network interface is an inband network interface, which is connected to the chipset, the baseboard management controller communicates with the remote control unit by a sideband way.

13. The computer system according to claim 1, wherein the baseboard management controller detects a current version message of the basic input/output system file in the basic input/output system unit and compares the current version message with a standard version message, when the current version message is inconsistent with the standard version message, the baseboard management controller switches the connection mode to the local mode.

14. The computer system according to claim 13, wherein the baseboard management controller is connected to a network interface, a remote storage unit is coupled to the network interface, when the current version message of the basic input/output system file in the basic input/output system unit is inconsistent with the standard version message, the baseboard management controller requests a basic input/output system updating file corresponding to the standard version message from the remote storage unit, and writes the basic input/output system updating file into the basic input/output system unit.

15. The computer system according to claim 14, wherein the standard version message is within the remote storage unit, the baseboard management controller periodically obtains the standard version message from the remote storage unit and compares the current version message of the basic input/output system file in the basic input/output system unit.

16. The computer system according to claim 14, wherein the network interface is an outband network interface, the outband network interface directly connects to the baseboard management controller.

17. The computer system according to claim 14, wherein the network interface is an inband network interface, the inband network interface is connected to the chipset, the baseboard management controller communicates with the remote storage unit by a sideband way.

18. The computer system according to claim 13, wherein the baseboard management controller is stored with a basic input/output system updating file corresponding to the standard version message, the baseboard management controller further writes the basic input/output system updating file into the basic input/output system unit.

19. The computer system according to claim 13, wherein when the baseboard management controller is in the bypass mode, the baseboard management controller communicates with the basic input/output system unit by the chipset and detects the current version message of the basic input/output system file in the basic input/output system unit.

20. The computer system according to claim 13, wherein when the baseboard management controller is in the local mode, the baseboard management controller directly communicates with the basic input/output system unit and obtains the current version message of the basic input/output system file in the basic input/output system unit.

21. The computer system according to claim 1, further comprising:
a keyboard controller style interlace,
a keyboard controller style unit is coupled to the keyboard controller style interface, the baseboard management controller communicates with the keyboard controller style unit via the keyboard controller style interface,
wherein the baseboard management controller receives basic input/output system updating command from the keyboard controller style unit and switches the connection mode to the local mode according to the basic input/output system updating file to update.

22. The computer system according to claim 1, wherein the baseboard management controller is connected to a intelligent platform management bus interface, a control unit is coupled to the intelligent platform management bus interface, the baseboard management controller communicates with the control unit via the intelligent platform management bus interface.

23. The computer system according to claim 1, wherein the chipset is a platform controller bus unit, the interface unit of the baseboard management controller is a serial peripheral interface unit, the basic input/output system unit and the platform controller bus unit connect to the interface unit via a serial peripheral interface line respectively, when the interface unit is in the bypass mode, the basic input/output system unit communicates with the platform controller bus unit directly.

24. The computer system according to claim 1, wherein when the connection mode of the baseboard management controller with the basic input/output system unit is in the bypass mode, the baseboard management controller communicates with the basic input/output system unit via the chipset.

25. A method for updating a basic input/output system of a computer system, comprising:
providing a computer system, the computer system comprising a central processing unit, a chipset connected to the central processing unit, a baseboard management controller connected to the chipset and a basic input/output system unit connected to the baseboard management controller, and switching a connection mode with the basic input/output system unit to a local mode by the baseboard management controller;
directly writing a basic input/output system updating file into the basic input/output system unit by the baseboard management controller, wherein the baseboard management controller communicates with the basic input/output system unit directly;
switching the connection mode with the basic input/output system unit to a bypass mode by the baseboard management controller before the central processing unit is powered on next time, wherein the basic input/output system unit communicates with the chipset through an interface unit of the baseboard management controller directly; and
reading an updated basic input/output system message by the chipset to complete an update of the basic input/output system unit when the central processing unit is powered on.

26. The method for updating the basic input/output system unit of the computer system according to claim 25, wherein during the step of directly writing the basic input/output system updating file into the basic input/output system unit by the baseboard management controller, the central processing unit is in a working state.

27. The method for updating the basic input/output system unit of the computer system according to claim 25, wherein during the step of writing the basic input/output system updating file into the basic input/output system unit by the baseboard management controller, the central processing unit is in a power-off state.

28. The method for updating the basic input/output system unit of the computer system according to claim 25, further comprising:
generating a basic input/output system updating command by a remote control unit, the remote control unit is communicatively connected to the baseboard management controller and transmits the basic input/output system updating command to the baseboard management controller, the baseboard management controller switches the connection mode with the basic input/output system unit to the local mode according to the basic input/output system updating command.

29. The method for updating the basic input/output system unit of the computer system according to claim 25, further comprising:
detecting a current version message of the basic input/output system file in the basic input/output system unit by the baseboard management controller, comparing the current version message with a standard version message, if the current version message is inconsistent with the standard version message, the connection mode is switched to the local mode by the baseboard management controller.

30. The method for updating the basic input/output system unit of the computer system according to claim 28, wherein the basic input/output system updating file is stored in the remote control unit.

31. The method for updating the basic input/output system unit of the computer system according to claim 25, wherein the basic input/output system updating file is stored in a remote storage unit.

32. The method for updating the basic input/output system unit of the computer system according to claim 25, wherein the basic input/output system updating file is stored in the baseboard management controller.

* * * * *